US011860946B2

United States Patent
Silverstein et al.

(10) Patent No.: US 11,860,946 B2
(45) Date of Patent: Jan. 2, 2024

(54) AUTONOMOUS WEBPAGE CONTENT SUMMATION

(71) Applicant: Kyndryl, Inc., New York, NY (US)

(72) Inventors: Michael Seth Silverstein, Jacksonville, FL (US); Zachary A. Silverstein, Georgetown, TX (US); Jayanth Krishnan, Mahopac, NY (US); Krishnan Sugavanam, Mahopac, NY (US)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 17/572,855

(22) Filed: Jan. 11, 2022

(65) Prior Publication Data
US 2023/0222164 A1    Jul. 13, 2023

(51) Int. Cl.
| | | |
|---|---|---|
| *G06F 16/00* | (2019.01) | |
| *G06F 16/9032* | (2019.01) | |
| *G06F 16/955* | (2019.01) | |
| *G06F 40/289* | (2020.01) | |
| *G06F 16/9538* | (2019.01) | |
| *G06F 40/253* | (2020.01) | |
| *G06F 16/2457* | (2019.01) | |

(52) U.S. Cl.
CPC .. *G06F 16/90332* (2019.01); *G06F 16/24578* (2019.01); *G06F 16/9538* (2019.01); *G06F 16/9558* (2019.01); *G06F 16/9566* (2019.01); *G06F 40/253* (2020.01); *G06F 40/289* (2020.01)

(58) Field of Classification Search
CPC ......... G06F 16/90332; G06F 16/24578; G06F 16/9538; G06F 16/9558; G06F 16/9566; G06F 40/253; G06F 40/289
See application file for complete search history.

(56) References Cited

U.S. PATENT DOCUMENTS

| | | | |
|---|---|---|---|
| 5,237,503 A | 8/1993 | Bedecarrax et al. | |
| 9,135,238 B2 | 9/2015 | Bunescu et al. | |
| 9,183,511 B2 * | 11/2015 | Li | G06N 5/02 |

(Continued)

FOREIGN PATENT DOCUMENTS

CN            111581973            8/2020

OTHER PUBLICATIONS

Kakarla, "Stop Clickbait", https://chrome.google.com/webstore/detail/stop-clickbait/ffolfpdcmehbghbamkgobjjdeejinma?hl=en, accessed Jan. 4, 2022, 6 pages.

(Continued)

*Primary Examiner* — Noosha Arjomandi
(74) *Attorney, Agent, or Firm* — Dan Housley; Andrew M. Calderon; Calderon Safran & Cole P.C

(57) ABSTRACT

A computer-implemented method includes: receiving, by a computing device, text extracted from a webpage in a browser and a Uniform Resource Locator (URL) of a linked webpage associated with the text; generating, by the computing device, questions based on the text; retrieving, by the computing device, content of the linked webpage using the URL; generating, by the computing device, answers to the questions using the retrieved content; and returning, by the computing device, the questions and the answers to the browser such that the browser displays the questions and the answers in the webpage.

19 Claims, 4 Drawing Sheets

(56) References Cited

U.S. PATENT DOCUMENTS

| | | | |
|---|---|---|---|
| 9,760,627 | B1 | 9/2017 | Bradley et al. |
| 10,110,659 | B2* | 10/2018 | Liu .................. H04L 67/02 |
| 10,282,389 | B2 | 5/2019 | Liang et al. |
| 10,587,674 | B1* | 3/2020 | Hansen .................. H04L 67/01 |
| 10,652,706 | B1* | 5/2020 | Sharifi ................ G06F 3/04845 |
| 11,036,801 | B1* | 6/2021 | Boteanu ............ G06F 16/90324 |
| 11,080,598 | B2 | 8/2021 | Kotri et al. |
| 11,113,275 | B2* | 9/2021 | Trummer .............. G06F 40/205 |
| 11,645,352 | B1* | 5/2023 | Douglas ............. G06Q 30/0271 |
| | | | 382/128 |
| 2002/0054083 | A1* | 5/2002 | Boreczky .............. G06F 16/745 |
| | | | 707/E17.028 |
| 2005/0010563 | A1* | 1/2005 | Gross .................. G06F 16/9538 |
| 2005/0164153 | A1* | 7/2005 | Beatty ....................... G09B 7/04 |
| | | | 434/323 |
| 2007/0022101 | A1 | 1/2007 | Smith et al. |
| 2008/0270209 | A1* | 10/2008 | Mauseth ............ G06Q 30/0201 |
| | | | 705/7.29 |
| 2008/0275694 | A1 | 11/2008 | Varone |
| 2011/0320543 | A1 | 12/2011 | Bendel et al. |
| 2013/0132374 | A1* | 5/2013 | Olstad .................... H04N 21/43 |
| | | | 715/234 |
| 2014/0040181 | A1* | 2/2014 | Kuznetsov ............ G06F 40/268 |
| | | | 706/55 |
| 2014/0180825 | A1* | 6/2014 | Ramer ............... G06Q 30/0269 |
| | | | 705/14.64 |
| 2016/0019812 | A1 | 1/2016 | Barkan et al. |
| 2016/0092245 | A1* | 3/2016 | Hogue .................... G06F 9/453 |
| | | | 715/711 |
| 2016/0117314 | A1 | 4/2016 | Kantor et al. |
| 2016/0125135 | A1* | 5/2016 | Ramanathan ....... G06F 16/5846 |
| | | | 705/3 |
| 2017/0235841 | A1* | 8/2017 | Li ..................... G06F 16/24578 |
| | | | 707/723 |
| 2017/0242915 | A1 | 8/2017 | Torisawa et al. |
| 2018/0060420 | A1* | 3/2018 | Wegryn .............. G06F 16/3329 |
| 2018/0095947 | A1* | 4/2018 | Castelli .................. G06F 40/289 |
| 2018/0122257 | A1 | 5/2018 | Nishihara |
| 2018/0260472 | A1 | 9/2018 | Kelsey et al. |
| 2019/0155904 | A1* | 5/2019 | Santos Moraes ..... G06F 40/279 |
| 2019/0171726 | A1 | 6/2019 | Ahmed et al. |
| 2019/0238635 | A1* | 8/2019 | Ng ...................... H04L 67/1095 |
| 2020/0057673 | A1* | 2/2020 | Suleman ............. G06F 16/9574 |
| 2020/0372830 | A1 | 11/2020 | Moon et al. |
| 2021/0182491 | A1* | 6/2021 | Chen ..................... G06F 40/289 |
| 2021/0295392 | A1* | 9/2021 | Jordan .................. G06F 16/955 |
| 2022/0058267 | A1* | 2/2022 | Chow ................ G06Q 30/0282 |
| 2022/0075935 | A1* | 3/2022 | Foncubierta Rodriguez ............... |
| | | | G06F 40/103 |
| 2022/0382728 | A1* | 12/2022 | Religa .................. G06F 40/197 |

OTHER PUBLICATIONS

Muthuraman et al., "Create a machine learning powered web app to answer questions", https://developer.ibm.com/patterns/create-a-machine-learning-powered-web-app-to-answer-questions-from-a-book/, Nov. 5, 2019, 6 pages.

Anonymous, "Linguistic Analysis Explained—Ascribe", https://goascribe.com/linguistic-analysis-explained/, accessed Nov. 27, 2021, 4 pages.

IBM Cloud Education, "What is Natural Language Processing?", https://www.ibm.com/cloud/learn/natural-language-processing, Jul. 2, 2020, 2 pages.

Anonymous, "Question Generation", https://devopedia.org/question-generation, accessed Nov. 28, 2021, 5 pages.

Chaves Saraiva de Melo et al., "Question Generation using Deep Neural Networks Exploring deep learning methods to generate questions", Jun. 2019, 62 pages.

Staff Writers, "CX value is well understood but silos are still getting in the way", https://which-50.com/cx-value-is-well-understood-but-silos are still-getting-in-the way/, Jan. 15, 2019, 5 pages.

\* cited by examiner

AUTONOMOUS WEBPAGE CONTENT SUMMATION

BACKGROUND

Aspects of the present invention relate generally to displaying webpage content and, more particularly, to autonomous webpage content summation.

Webpages may display headlines that are intended to draw users into the desired content. Clicking on the headline navigates the user to another webpage that is linked to the headline via a hyperlink. The headline itself contains some indication of the content of the linked page. A URL preview shown on the same page as the headline can also contain some indication of the content of the linked page.

SUMMARY

In a first aspect of the invention, there is a computer-implemented method including: receiving, by a computing device, text extracted from a webpage in a browser and a Uniform Resource Locator (URL) of a linked webpage associated with the text; generating, by the computing device, questions based on the text; retrieving, by the computing device, content of the linked webpage using the URL; generating, by the computing device, answers to the questions using the retrieved content; and returning, by the computing device, the questions and the answers to the browser such that the browser displays the questions and the answers in the webpage.

In another aspect of the invention, there is a computer program product including one or more computer readable storage media having program instructions collectively stored on the one or more computer readable storage media. The program instructions are executable to: receive text extracted from a webpage in a browser and a Uniform Resource Locator (URL) of a linked webpage associated with the text; generate a question based on the text; retrieve content of the linked webpage using the URL; generate answers to the question using the retrieved content; determine a highest ranked answer based on respective confidence scores of each of the answers; and return the question and the highest ranked answer to the browser such that the browser displays the question and the highest ranked answer in the webpage.

In another aspect of the invention, there is system including a processor, a computer readable memory, one or more computer readable storage media, and program instructions collectively stored on the one or more computer readable storage media. The program instructions are executable to: receive text extracted from a webpage in a browser and a Uniform Resource Locator (URL) of a linked webpage associated with the text; generate a question based on the text; retrieve content of the linked webpage using the URL; generate answers to the question using the retrieved content; determine a highest ranked answer based on respective confidence scores of each of the answers; and return the question and the highest ranked answer to the browser such that the browser displays the question and the highest ranked answer in the webpage.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
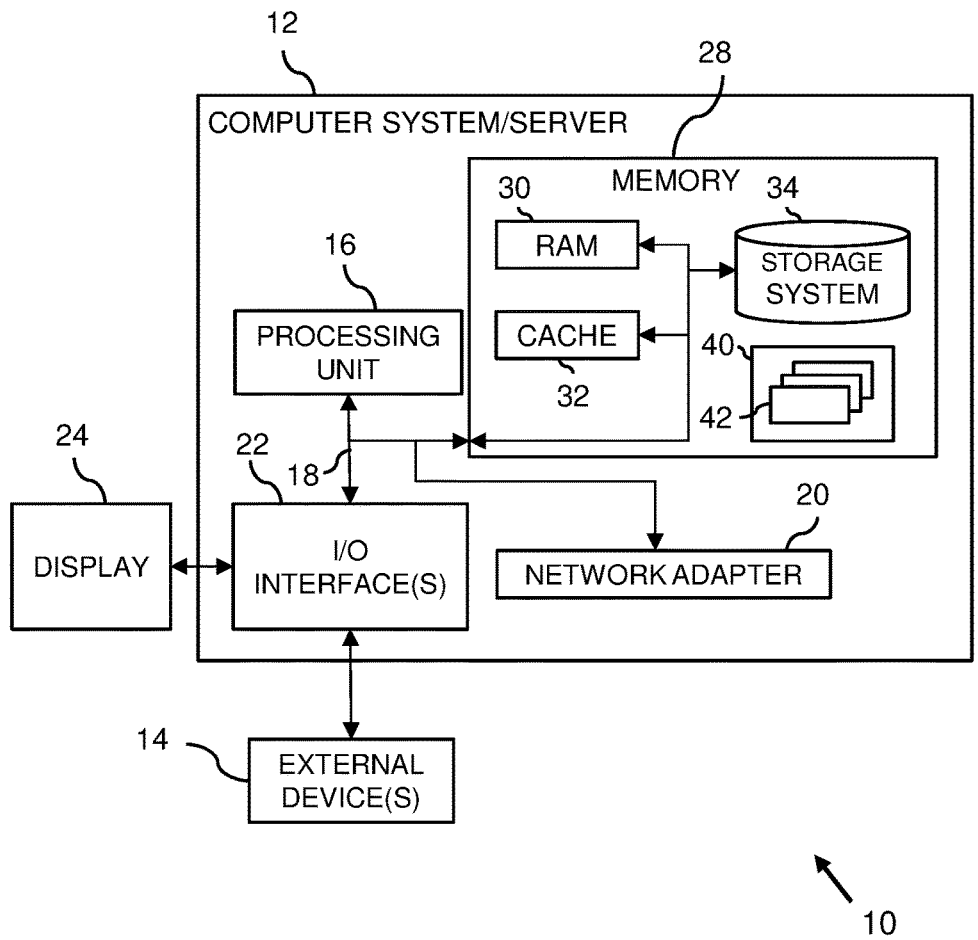
FIG. 1 depicts a computer infrastructure according to an embodiment of the present invention.

Aspects of the present invention relate generally to displaying webpage content and, more particularly, to autonomous webpage content summation. Oftentimes when viewing news stories, headlines, or links, content providers want to draw users into the desired content. Such headlines may be intentionally or unintentionally vague, leaving the user wondering about one or more aspects mentioned in the headline. The user may not wish to read a full story of the page linked to by the headline, but nonetheless may wish to quickly ascertain more information about a vague aspect of the headline. One way to achieve this is to mouse over the headline and read a URL preview associated with the headline. However, the URL preview may or may not contain the information that a user seeks to disambiguate vague aspects of the headline. As a result, the user is faced with the choice of either clicking on the headline and reading the linked page that they wished to avoid or go without resolving the vague aspects of the headline, both of which are unsatisfactory results.

Aspects of the invention address this problem by providing a system and method that provide the user with additional information about vague aspects of the headline without requiring that the user navigate to the linked page. In accordance with aspects of the invention, the system generates questions using the text of the headline, answers the questions using the text of the linked page, and presents the questions and answers to the user while the user has their mouse hovering over the headline, without the user navigating to the linked page. In embodiments, the system determines components of the headline using natural language processing, such as linguistic analysis including sentence analysis and grammar analysis. In embodiments, the system uses question generation (QG) techniques to generate questions about the determined components of the headline. In embodiments, the system determines answers to the generated questions using question answering (QA) techniques and the text of the linked page. In embodiments, the system causes the user device to display the generated questions and answers in the user's browser while the user has their mouse hovering over the headline. In this manner, implementations of the invention provide the user with more information about the linked page without requiring the user to navigate to the linked page. With this additional information, the user may decide whether they wish to navigate to the linked page or move on to other content.

Implementations of the invention provide a technical solution to the technical problem of webpages that contain vague headlines. In embodiments, the technical solution includes computer-based natural language processing of a headline, automated question generation using the headline, and automated question answering using the text of the webpage. This technical solution provides an improvement in the field of webpages by providing users with more information about a linked page without requiring the user to navigate to the linked page.

As will be apparent from the description herein, aspects of the invention include a method to provide answers to ambiguous hyperlink headlines, the method comprising: identifying a hyperlink that is ambiguous and/or poses a questions with no clear answer; selecting (e.g., hover over with mouse) the hyperlink with an input/pointing device; analyzing, using NLP the content of the headline to identify a question, wherein the analysis can include transforming a non-question headline into a question form; sending a request to the hyperlink to retrieve the target webpage, and analyzing the retrieved data to determine an answer to the question; and displaying, in a popup over the hyperlink, the determined answer, wherein the user may provide feedback to indicate if the answer is relevant/correct. Aspects of the invention also include a system and a computer program product that perform the method.

It should be understood that, to the extent implementations of the invention collect, store, or employ personal information provided by, or obtained from, individuals (for example, user profile information), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
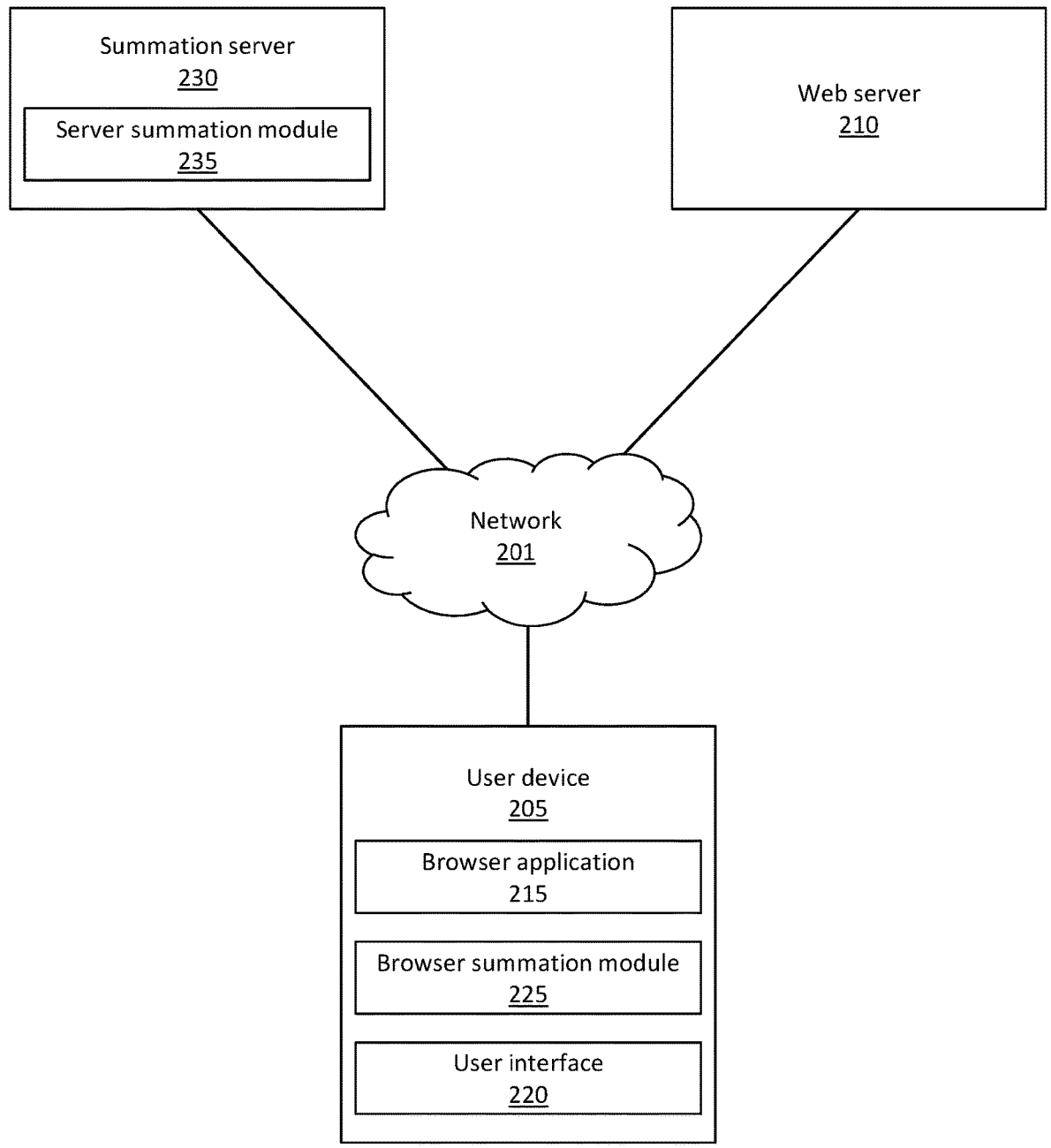
FIG. 2 shows a block diagram of an exemplary environment in accordance with aspects of the invention.

FIG. 2 shows a block diagram of an exemplary environment in accordance with aspects of the invention. In embodiments, the environment includes a network 201 that provides communication between a user device 205, a web server 210, and a summation server 230. The network 201 includes one or more communication networks such as a LAN, WAN, and the Internet and combinations thereof. The user device 205 includes a computing device such as a desktop computer, laptop computer, tablet computer, smartwatch, etc., and may include one or more elements of computer system 12 of FIG. 1. Each of the web server 210 and the summation server 230 may comprise one or more server computing devices each including one or more elements of computer system 12 of FIG. 1. In another example, each of the web server 210 and the summation server 230 may comprise one or more virtual machines (VMs) or one or more containers running on one or more server computing devices. The web server 210 is configured to serve web content to the user device 205 using Hypertext Transfer Protocol (HTTP) and/or Hypertext Transfer Protocol Secure (HTTPS).

The user device 205 includes a browser application 215 that cooperates with the web server 210 to provide web content for display via a browser user interface (UI) 220. For example, based on user input at the UI 220, the browser application 215 may send an HTTP request to the web server 210, receive content from the web server 210 in response to the request, and display the content to the user via the UI 220. The content may be, for example, a webpage from a particular website. The webpage displayed may include one or more headlines that are hyperlinked to other webpages in the same website or a different website. The browser application 215 may comprise an application program such as program/utility 40 of FIG. 1.

In accordance with aspects of the invention, the user device 205 includes a browser summation module 225 that cooperates with the summation server 230 to perform one or more of the processes described herein. In embodiments, the browser summation module 225 is an plug-in, add-on, or extension of the browser application 215 and may include one or more program modules such a program modules 42 of FIG. 1. In embodiments, the browser summation module 225 is configured to: detect that a mouse cursor is on (e.g., hovering over) hypertext in a webpage displayed in the UI 220; extract the text of the hypertext from the webpage; extract a Uniform Resource Locator (URL) defined in a hyperlink of the hypertext; and send the text of the hypertext and the URL to a server summation module 235 of the summation server 230. In accordance with aspects of the invention, the server summation module 235 is configured to: determine objects of the hypertext headline; generate questions based on the determined objects; generate answers to the questions using content in a webpage defined by the URL; and return the questions and the answers to the browser summation module 225. In accordance with aspects of the invention, the browser summation module 225 is configured to cause the browser application 215 to display the received questions and answers in the UI 220 while the mouse is on the hypertext.

As illustrated in FIG. 2, in embodiments the summation server 230 comprises the server summation module 235, which may comprise one or more program modules such as program modules 42 described with respect to FIG. 1. The summation server 230 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In embodiments, when the user hovers their mouse cursor over hypertext in a webpage using the browser application 215, the browser summation module 225 extracts the text of the hypertext and the URL of the hypertext from the HyperText Markup Language (HTML) code of the webpage. In embodiments, the browser summation module 225 sends the extracted text and URL to the server summation module 235 via the network 201.

In accordance with aspects of the invention, the server summation module 235 determines components of the text of the hypertext using natural language processing. Natural language processing (NLP) refers to the branch of artificial intelligence (AI) concerned with giving computers the ability to understand text and spoken words in much the same way human beings can. NLP combines computational linguistics with statistical, machine learning, and deep learning models. Together, these technologies enable computers to process human language in the form of text or voice data and to 'understand' its full meaning, complete with the speaker or writer's intent and sentiment. In one example, the server summation module 235 uses linguistic analysis, including sentence analysis and grammar analysis, to determine: sentence components of the text (e.g., subject(s), verb(s), and object(s)); whether each of the determined subjects and objects is a common noun or a proper noun; and whether the text is in the form of a question. In one exemplary implementation, the summation server 220 includes programming that performs the linguistic analysis to determine the components of the text. In another exemplary implementation, the summation server 220 calls a service that performs the linguistic analysis to determine the components of the text, e.g., using an application programming interface (API) call to another server includes programming that performs the linguistic analysis, and receives the determined components of the text in response to the API call.

In accordance with aspects of the invention, the server summation module 235 generates questions about the text of the hypertext based on the linguistic analysis. In embodiments, the server summation module 235 generates the questions using automated question generation (QG) techniques. In embodiments, the server summation module 235 uses QG algorithms to generate question types (e.g., who/what/where/when/how many) using the common noun subjects and objects determined by the linguistic analysis. The QG algorithms may utilize neural networks, for example. In embodiments, the generated questions are included in a list of generated questions. In embodiments, in response to determining that the hypertext itself is in the form of a question, the server summation module 235 includes this question posed by the hypertext in the list of generated questions. In one exemplary implementation, the summation server 220 includes programming that generates the questions (e.g., using QG algorithms). In another exemplary implementation, the summation server 220 calls a QG service that generates the questions, e.g., using an API call to another server that includes a QG system, and receives the questions in response to the API call.

In accordance with aspects of the invention, the server summation module 235 generates answers to the questions included in the list of generated questions using content of the webpage defined by the URL associated with the hypertext. In embodiments, the server summation module 235 generates the answers using automated question answering (QA) techniques. In embodiments, the server summation module 235 obtains the content of the webpage defined by the URL from the web server 210. Then, using this content, the server summation module 235 uses QA to generate answers to the questions included in the list of generated questions. In embodiments, the server summation module 235 generates a list of question-answer pairs including the questions included in the list of generated questions and their respective answers. In one exemplary implementation, the summation server 220 includes programming that generates the answers (e.g., using QA algorithms). In another exemplary implementation, the summation server 220 calls a QA service that generates the answers, e.g., using an API call to another server that includes a QA system, and receives the answers in response to the API call.

In embodiments, the server summation module 235 determines one or more candidate answers for a particular question and determines a respective confidence score associated with each of the one or more candidate answers. In embodiments, the server summation module 235 selects a one of the one or more candidate answers having the highest confidence score (relative to the other ones of the one or more candidate answers) as the answer for this particular question. In embodiments, the server summation module 235 compares the confidence score of the answer for this particular question to a predefined threshold value. In the event the confidence score is greater than or equal to the predefined threshold value, then the server summation module 235 deems this answer satisfactory and adds this answer and question as a question-answer pair to a list of question-answer pairs. On the other hand, in the event the confidence score does not exceed the predefined threshold value, then the server summation module 235 deems that there is not a satisfactory answer to this question and does not include this question in the list of question-answer pairs.

In accordance with aspects of the invention, the server summation module 235 sends the list of question-answer pairs to the browser summation module 225. In response to receiving the question-answer pairs, the browser summation module 225 causes the browser application 215 to display the question-answer pairs included in the list of question-answer pairs in the UI 220 while the mouse cursor is on the hypertext. In this manner, the user is provided with additional information about the text of the hypertext.

In accordance with aspects of the invention, the browser summation module 225 is configured to receive feedback from the user about the displayed question-answer pairs. In embodiments, the browser summation module 225 causes the browser application 215 to display an object or field that permits the user to provide positive or negative feedback respectively for each of the displayed question-answer pairs. In one example, the feedback indicates that the user either likes or dislikes this question. The browser summation module 225 sends this feedback to the server summation module 235. In embodiments, in response to receiving user feedback that the user likes a particular question, the server summation module 235 determines the question type (e.g., who/what/where/when/how many) and adjusts the QG algorithms in a manner that makes the QG algorithms more likely to generate this type of question for this user. In embodiments, in response to receiving user feedback that the user dislikes a particular question, the server summation module 235 determines the question type and adjusts the QG algorithms in a manner that makes the QG algorithms less likely to generate this type of question for this user. In embodiments, the server summation module 235 saves the adjusted QG algorithms in a profile that is specific to this user, so that an output of the system can be individualized to this particular user (e.g., to be more likely to ask the types of questions that this user cares more about). In embodiments, by saving respective profiles in this manner for plural different users, the system can individualize its output for each user.

Figure 3:
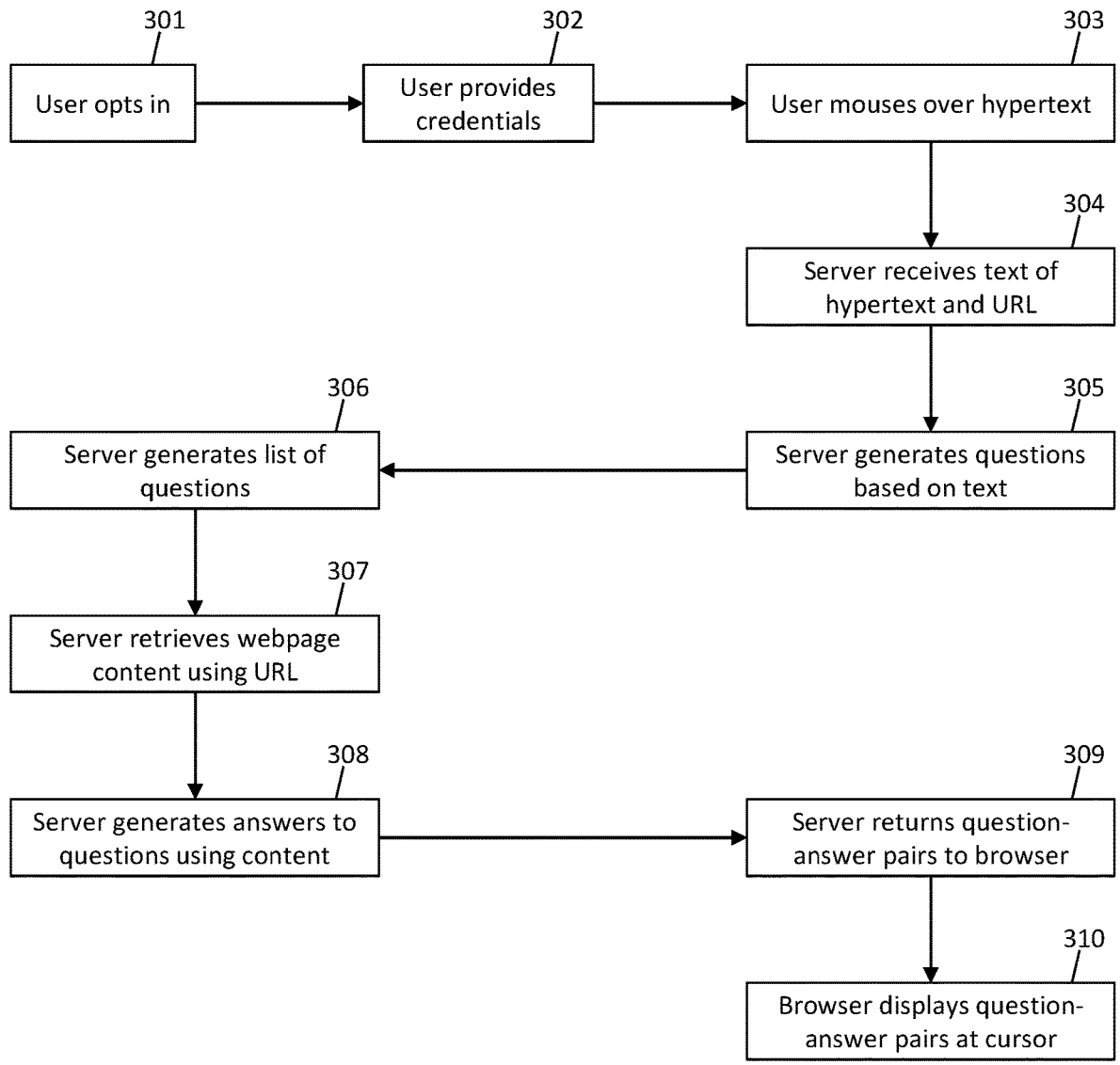
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG. 2 and are described with reference to elements depicted in FIG. 2.

At step 301, a user opts in to participating in a service that provides content summation in accordance with aspects of the invention. In embodiments, the user completes an opt-in process (e.g., registration, consent agreement, etc.) in the UI 220. The opt-in may be part of a registration process in which the user is provided with credentials (e.g., username, password, etc.) for this service.

At step 302, the user provides their credentials to the system. In embodiments, the user provides their credentials (from step 301) via the browser application. In this manner, the system determines that the user is logged in to this service and wishes to be presented, in their UI 220, with additional information about the content of a webpage that is linked to hypertext on which they hover their mouse cursor.

At step 303, the user mouses over hypertext in a webpage. In embodiments, the browser application 215 displays a webpage in the UI 220, and the user controls their mouse to position the mouse cursor over hypertext included in the webpage. In embodiments, in response to the mouse cursor being over a particular hypertext, the browser summation module 225 extracts the text of this hypertext and extracts the URL of the hyperlink associated with this hypertext.

At step 304, the server 230 receives the extracted text and URL. In embodiments, the browser summation module 225 sends the extracted text and URL to the server 230 via the network 201. The text and URL may be sent as part of a call (e.g., a web service call or an API call) made from the browser summation module 225 to the server 230.

At step 305, the server 230 generates one or more questions based on the text received at step 304. In embodiments, and as described with respect to FIG. 2, the server summation module 235 determines components of the text (i.e., the extracted text of the hypertext) using linguistic analysis of the text, such as sentence analysis combined with grammar analysis. In embodiments, and as described with respect to FIG. 2, the server summation module 235 then generates questions about the text, e.g., using QG techniques to generate question of the type who/what/where/when/how-many using common noun subjects and objects determined by the linguistic analysis.

At step 306, the server 230 generates a list of questions. In embodiments, the server summation module 235 generates a list of questions that includes the questions generated at step 305. The list may be in the form of a question array.

At step 307, the server 230 retrieves webpage content using the URL that was received at step 304. In embodiments, the server summation module 235 uses the URL to obtain the content of the webpage defined by the URL. For example, the server summation module 235 may make a call to the web server 210 requesting the content associated with the webpage defined by the URL. In one example, the server summation module 235 uses web scraping with the URL to retrieve the webpage content.

At step 308, the server 230 generates answers to the questions (of step 306) using the content (of step 307). In embodiments, the server summation module 235 generates answers to the questions included in the question list using QA with the content of the linked webpage, as described herein. In embodiments, the server summation module 235 selects a single highest ranked answer for each question in the question list. In embodiments, if the highest ranked answer for a question has a confidence score that is less than a predefined threshold value, then the server summation module 235 deletes that question from the question list. In embodiments, the server summation module 235 generates a list of question-answer pairs including the questions included in the list of generated questions and their respective answers.

At step 309, the server 230 returns the question-answer pairs to the browser. In embodiments, the server summation module 235 sends the list of question-answer pairs (from step 308) to the browser application 215 of the user device 205 via the network 201.

At step 310, the browser displays the question-answer pairs at the cursor in the browser interface. In embodiments, the browser summation module 225 causes the browser 215 to display the question-answer pairs with the cursor in the UI 220. The display can take any desired form, such as a cursor pop-up window that contains the question-answer pairs.

Figure 4:
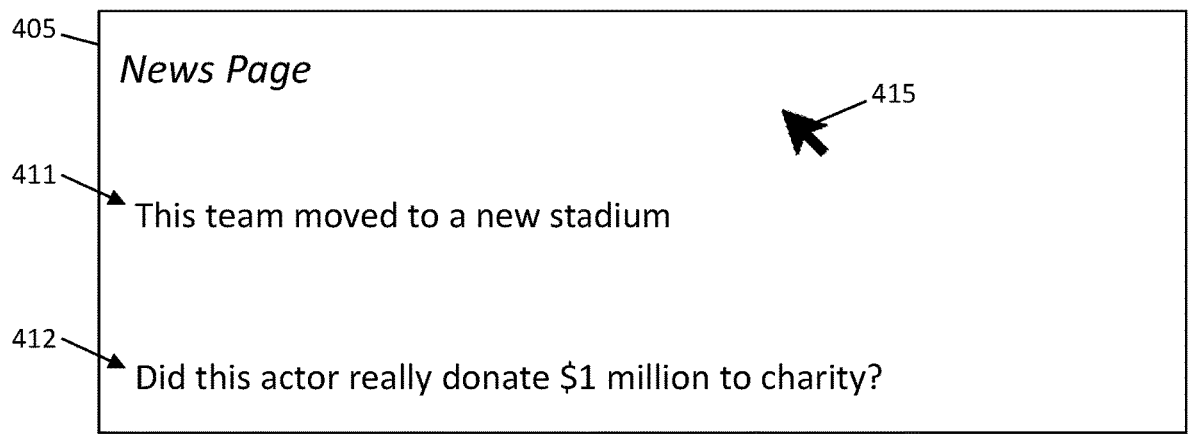
FIGS. 4, 5, and 6 show an exemplary use case that illustrates aspects of the invention.
Figure 5:
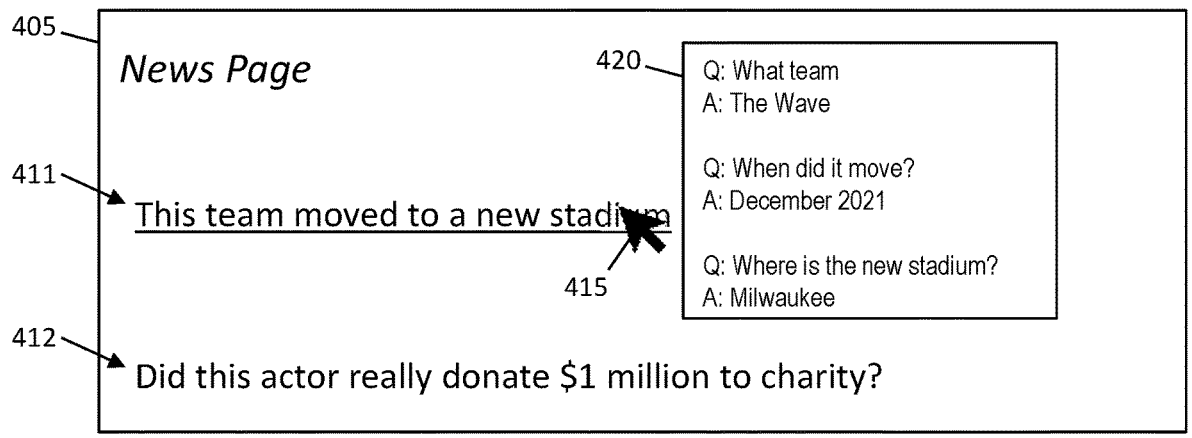
Figure 6:
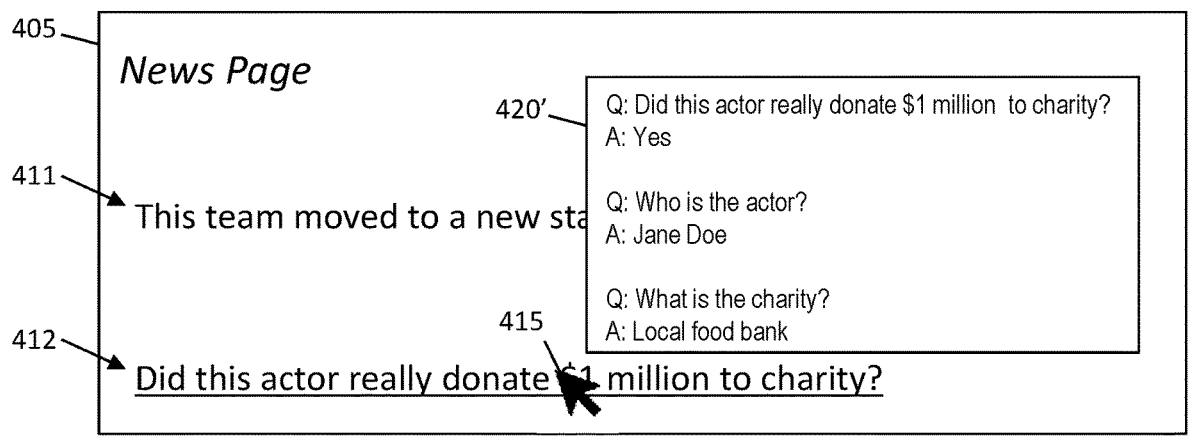

FIGS. 4-6 show an exemplary use case that illustrates aspects of the invention. The use case is carried out in the environment of FIG. 2 and is described with reference to elements depicted in FIGS. 2 and 3.

FIG. 4 shows a webpage 405 displayed in a browser, e.g., UI 220 of FIG. 2. The webpage 405 includes headlines 411 and 412 that are hypertext in the displayed webpage. The first headline 411 is first hypertext associated with a first hyperlink that contains a first URL to a first linked webpage. The second headline 412 is second hypertext associated with a second hyperlink that contains a second URL to a second linked webpage. A mouse cursor 415 is displayed in the browser, e.g., UI 220, for selecting objects in the webpage 405. In FIG. 4, the cursor 415 is not hovering on either headline 411, 412.

FIG. 5 shows the same webpage 405 after the user has moved the cursor 415 to a position on (e.g., hovering over) the first headline 411. In response to detecting the cursor 415 is positioned on the hypertext of the first headline 411, the browser summation module 225 extracts the text of this hypertext ("This team moved to a new stadium" in this example) and extracts the URL of the hyperlink associated with this hypertext (e.g., step 303 of FIG. 3). In this example, the browser summation module 225 sends the extracted text and the URL to the server 230 (e.g., step 304). In this example, the server 230 generates questions using the text (e.g., step 305), obtains the content of the webpage using the URL (e.g., step 307), generates answers to the questions using the content of the webpage (e.g., step 308), and returns the questions and answers to the browser. As shown in FIG. 4, the browser, e.g., UI 220, displays the questions and answers in a cursor pop-up 420.

FIG. 6 shows the same webpage 405 after the user has moved the cursor 415 to a position on (e.g., hovering over) the second headline 412. In response to detecting the cursor 415 is positioned on the hypertext of the second headline 412, the browser summation module 225 extracts the text of this hypertext ("Did this actor really donate $1 million to charity?" in this example) and extracts the URL of the hyperlink associated with this hypertext (e.g., step 303 of FIG. 3). In this example, the browser summation module 225 sends the extracted text and the URL to the server 230 (e.g., step 304). In this example, the server 230 generates questions using the text (e.g., step 305), obtains the content of the webpage using the URL (e.g., step 307), generates answers to the questions using the content of the webpage (e.g., step 308), and returns the questions and answers to the browser. As shown in FIG. 4, the browser, e.g., UI 220, displays the questions and answers in a cursor pop-up 420'.

In this manner, aspects of the invention may be used to provide a system and method that captures a hyperlink, forms multiple NLP queries from the given hyperlink text, and injects an NLP discovery call to process and return the queries back to the user at the top level. In one example, an entity that owns of a website that provides weather news and information wishes to ensure that user engagement is optimized on webpages within their website. In this example, the entity may encourage uses to equip their browser with the browser summation module 225. In this example, the application connects to the user's personal profile and determines that the user frequently travels and has upcoming travel plans to Atlanta. In this example, the user mouses over an article titled "East coast has expected poor weather incoming." In response to this, the system generates a user relevant question of "Where is the poor weather focused?" and returns an answer of "Maine and New Hampshire." In this example, the user's browser displays the question and answer, and the user is thus informed of the location of the poor weather without having to navigate to the linked webpage.

In accordance with an additional aspect of the invention, the system generates respective lists of question-answer pairs for each of plural headlines included in a webpage in response to a first time a user navigates to the webpage. In this example, the system goes through the NLP, QG, and QA steps of the process for each headline without requiring that the user hover their mouse over each headline. In this example, the system caches respective lists of question-answer pairs for each headline. Then, when the user mouses over one of the headlines, the system obtains the list of question-answer pairs for this headline from the cache and displays the list of question-answer pairs for this headline in the browser. Applying this aspect to the example of FIG. 4, the system would determine respective lists of question-answer pairs for each headline 411, 412 prior to the user hovering their mouse cursor over either headline. This preprocessing and caching provide for essentially zero (0) lag time between when the mouse cursor first hovers over a headline and when the browser displays the question-answer pairs for each headline for this headline.

In accordance with an additional aspect of the invention, the system determines a personalization component based on a profile of who is viewing or the content. In embodiments, the system pushes additional questions and answers to the user based on the determined personalization component, and only answer questions relevant to a given user.

In view of the foregoing description, in additional aspects of the invention there is a method in which a user opts in to using the browser summation module 225 and allows access to the user's web browser. In this method, the user ensures proper credentials and applications are present and connected for NLP of the title and NLP discovery of the document. In this method, the user mouses over hypertext of a hyperlink. In response to the user mousing over the hypertext, the module makes an initial processing call to determine if the hypertext is a question style or a non-question style. In this example, the hypertext is a question style if the text is in a question format or can be reformed as question as determinable by a machine learning Question Answering model (e.g., which companies are making massive strides in Machine Learning?). In this example, the hypertext is a non-question style if the text references top level topics such as country, name, location, time, company, etc. (e.g., new stadium name has a 20% approval rating). In this method, if the content is valid, then the server summation module 235 forms questions, e.g., as described herein. The list of questions may be stored in an array on the cloud processing module for the hyperlink along with the hyperlink URL of the given webpage. In some embodiments, if login is required to access the content of the linked page, the module may capture the content locally on the user's device.

In this method, the server summation module 235 sends a request to retrieve the target webpage. The module's request returns the webpage in image format and OCR or with a text ingestion module to extract the text of the webpage. This information may be stored in an object on the server summation module 235. In this method, when the information is successfully retrieved, a question answering module is activated against the ingested text. In this method, results of the answers to these questions are sent back to the user's device via the connection to the server summation module 235. In this method, answers are sent if they have a confidence score that exceeds a threshold, while low confidence answers may be removed, ignored, or marked as low likelihood. In this method, the user's machine receives the answers and generates a pop up over the cursor and highlighting of the hyperlink showing the questions and answers. In this method, the user may utilize a learning loop and train the module to better ask the types of questions the user cares about.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving, by a computing device, text extracted from a webpage in a browser and a Uniform Resource Locator (URL) of a linked webpage associated with the text;
generating, by the computing device, questions based on the text;
retrieving, by the computing device, content of the linked webpage using the URL;
generating, by the computing device, answers to the questions using the retrieved content;
returning, by the computing device, the questions and the answers to the browser such that the browser displays the questions and the answers in the webpage;
receiving feedback from a user about the questions and the answers;
in response to the feedback indicating the user likes a particular one of the questions, determining a question type of the particular one of the questions and adjusting automated question generation algorithms in a manner that makes the automated question generation algorithms more likely to generate the determined question type for the user; and
in response to the feedback indicating the user dislikes a particular one of the questions, determining a question type of the particular one of the questions and adjusting automated question generation algorithms in a manner that makes the automated question generation algorithms less likely to generate the determined question type for the user.

2. The method of claim 1, wherein the text is extracted from hypertext in the webpage and the URL is defined in a hyperlink associated with the hypertext.

3. The method of claim 1, wherein the generating the questions comprises:
determining objects in the text using linguistic analysis; and
generating the questions using the objects and automated question generation (QG).

4. The method of claim 3, wherein the linguistic analysis comprises sentence analysis and grammar analysis of the text.

5. The method of claim 3, wherein:
the determining objects comprises determining common nouns; and
the questions are questions about the determined common nouns.

6. The method of claim 1, wherein the generating the answers comprises:
generating the answers using the retrieved content and automated question answering (QA).

7. The method of claim 1, wherein:
the text and the URL are received in response to a user hovering a mouse cursor over hypertext in the webpage; and
the browser is configured to display the questions and the answers in a cursor pop-up window while the mouse cursor is still over the hypertext.

8. The method of claim 1, wherein the text is from one of plural hypertext headlines included in the webpage, and further comprising preprocessing the plural hypertext headlines in response to a user first visiting the webpage, the preprocessing comprising:
generating respective lists of question-answer pairs for each of plural hypertext headlines; and
storing the respective lists of question-answer pairs in a cache.

9. The method of claim 1, further comprising:
   determining the text is in the form of a particular question; and
   wherein the generating the answers comprises generating an answer to the particular question using the retrieved content; and
   including the particular question and the answer to the particular question in the questions and the answers that are returned to the browser for display in the browser.

10. A computer program product comprising one or more computer readable storage media having program instructions collectively stored on the one or more computer readable storage media, the program instructions executable to:
   receive text extracted from a webpage in a browser and a Uniform Resource Locator (URL) of a linked webpage associated with the text;
   generate a question based on the text;
   retrieve content of the linked webpage using the URL;
   generate answers to the question using the retrieved content;
   determine a highest ranked answer based on respective confidence scores of each of the answers; and
   return the question and the highest ranked answer to the browser such that the browser displays the question and the highest ranked answer in the webpage,
   wherein the text is from one of plural hypertext headlines included in the webpage, and further comprising pre-processing the plural hypertext headlines in response to a user first visiting the webpage, the preprocessing comprising:
   generating respective lists of question-answer pairs for each of plural hypertext headlines; and
   storing the respective lists of question-answer pairs in a cache.

11. The computer program product of claim 10, wherein the text is extracted from hypertext in the webpage and the URL is defined in a hyperlink associated with the hypertext.

12. The computer program product of claim 10, wherein the generating the question comprises:
   determining an object in the text using linguistic analysis; and
   generating the question using the object and automated question generation (QG).

13. The computer program product of claim 10, wherein the generating the answers comprises:
   generating the answers using the retrieved content and automated question answering (QA).

14. The computer program product of claim 10, wherein:
   the text and the URL are received in response to a user hovering a mouse cursor over hypertext in the webpage; and
   the browser is configured to display the question and the highest ranked answer in a cursor pop-up window while the mouse cursor is still over the hypertext.

15. A system comprising:
   a processor, a computer readable memory, one or more computer readable storage media, and program instructions collectively stored on the one or more computer readable storage media, the program instructions executable to:
   receive text extracted from a webpage in a browser and a Uniform Resource Locator (URL) of a linked webpage associated with the text;
   generate a question based on the text;
   retrieve content of the linked webpage using the URL;
   generate answers to the question using the retrieved content;
   determine a highest ranked answer based on respective confidence scores of each of the answers; and
   return the question and the highest ranked answer to the browser such that the browser displays the question and the highest ranked answer in the webpage,
   wherein the text is from one of plural hypertext headlines included in the webpage, and further comprising pre-processing the plural hypertext headlines in response to a user first visiting the webpage, the preprocessing comprising:
   generating respective lists of question-answer pairs for each of plural hypertext headlines; and
   storing the respective lists of question-answer pairs in a cache.

16. The system of claim 15, wherein the returning is performed in response to determining that a confidence score of the highest ranked answer exceeds a predefined threshold value.

17. The system of claim 15, wherein the generating the question comprises:
   determining an object in the text using linguistic analysis; and
   generating the question using the object and automated question generation (QG).

18. The system of claim 15, wherein the generating the answers comprises:
   generating the answers using the retrieved content and automated question answering (QA).

19. The system of claim 15, wherein:
   the text and the URL are received in response to a user hovering a mouse cursor over hypertext in the webpage; and
   the browser is configured to display the question and the highest ranked answer in a cursor pop-up window while the mouse cursor is still over the hypertext.

* * * * *